United States Patent [19]

Herden

[11] Patent Number: 4,487,074
[45] Date of Patent: Dec. 11, 1984

[54] PRESSURE SENSOR WITH A HALL ELEMENT CIRCUIT

[75] Inventor: Werner Herden, Gerlingen, Fed. Rep. of Germany

[73] Assignee: Robert Bosch GmbH, Stuttgart, Fed. Rep. of Germany

[21] Appl. No.: 468,396

[22] Filed: Feb. 22, 1983

[30] Foreign Application Priority Data

Mar. 8, 1982 [DE] Fed. Rep. of Germany ....... 3208243
Jul. 23, 1982 [DE] Fed. Rep. of Germany ....... 3227516

[51] Int. Cl.³ .......................... G01L 9/00; H01L 10/10
[52] U.S. Cl. ........................................ 73/708; 73/728; 73/DIG. 3; 338/41
[58] Field of Search ............... 73/708, 728, 722, 754, 73/DIG. 3, 717; 423/88, 671, 674; 338/41, 42; 324/207, 251

[56] References Cited

U.S. PATENT DOCUMENTS

| 3,297,418 | 1/1967 | Firestone et al. | 428/671 |
| 3,326,719 | 6/1967 | Beltzer et al. | 428/671 |
| 3,575,054 | 4/1971 | Glista et al. | 73/DIG. 3 |
| 4,077,262 | 3/1978 | Cholet et al. | 73/722 |
| 4,165,653 | 8/1979 | Morehouse et al. | 73/708 |
| 4,254,395 | 3/1981 | Herden | 338/41 |
| 4,343,180 | 8/1982 | Herden et al. | 73/717 |
| 4,371,837 | 2/1983 | Sieverin | 324/251 |

FOREIGN PATENT DOCUMENTS

| 2842140 | 4/1980 | Fed. Rep. of Germany | 132/40 |
| 0667839 | 6/1979 | U.S.S.R. | 73/722 |

Primary Examiner—Donald O. Woodiel
Attorney, Agent, or Firm—Frishauf, Holtz, Goodman & Woodward

[57] ABSTRACT

A deformable pressure chamber (10) moves a permanent magnet (12) carried by it as it is deformed. A GaAs Hall element (13) is disposed on a substrate plate (1) opposite the permanent magnet, and the substrate plate also carries a hybrid circuit including a temperature compensating network of thick film resistors and an amplifier. The Hall element is subject to only small temperature effects, and these are compensated in a circuit that can work with a low supply voltage.

3 Claims, 3 Drawing Figures

PRESSURE SENSOR WITH A HALL ELEMENT CIRCUIT

This invention concerns a pressure sensor containing a membrane chamber coaxially within a casing, carrying a permanent magnet on one wall of the membrane chamber and having an element sensitive to the magnetic field fixed on the casing for providing a response indicative of the position of the magnet.

It is known to use pressure sensors of the type just mentioned for measurement of absolute or relative pressures in which a deformable membrane chamber of of general kind used in aneroid barometers moves a permanent magnet affixed thereto in response to pressure changes and the magnet cooperates with a magnetic field sensitive element that is fixed in position. Such a sensor is shown for example in German published patent application (OS) No. 28 42 140.

The known sensors just mentioned require a separate evaluation circuit and, furthermore, undesired temperature dependences result and particular provisions regarding the operating voltage of the evaluation circuit are required.

THE INVENTION

It is an object of the present invention to provide a pressure sensor of the general type above described in which the circuit of the magnetic field sensitive element is built in or built on, is compensated with respect to temperature and has easily-met requirements regarding the supply voltage.

Briefly, the magnetic field sensitive element is a gallium arsenide (GaAs)Hall-effect element which is mounted on a substrate plate which also carries the necessary circuit for the Hall element, which is of the so-called hybrid type and includes thick film resistors of different temperature coefficients and also a differential amplifier.

The substrate plate typically is a wall of the casing. The sensor of the invention has the advantage that by integration of the evaluation circuit in the sensor casing, a particularly compact construction of the sensor is possible which is also highly immune to disturbances. The Hall element has a particularly small variation with temperature and this small variation in its output can be compensated by the way the integrated evaluation circuit is constituted.

When the sensor is constituted as an absolute pressure sensor, a completely closed, preferably evacuated membrane chamber is used. The casing is closed off by a substrate plate and in its interior the pressure to be measured reigns, by virtue of an access duct or aperture. The disposition of the Hall element and its evaluation circuit on the side of the substrate plate is external to the casing and protects these elements from the often aggressive pressure medium.

In the case of an absolute pressure sensor, a particularly compact construction is obtained when a copper plate is used as the substrate plate which carries the integrated evaluation circuit and the Hall element on one side and is soldered to a corrugated half-chamber membrane on the other side, so that membrane chamber and substrate plate form a unitary component. An enamel layer provides insulation between the circuit and the substrate plate itself. The steps of manufacture involved in the last-mentioned type of embodiment are highly compatible, resulting in a simple manufacturing procedure.

THE DRAWING

The invention is further described by way of illustrative example with reference to the annexed drawings, in which.

DESCRIPTION OF THE ILLUSTRATED EMBODIMENTS

Figure 1:
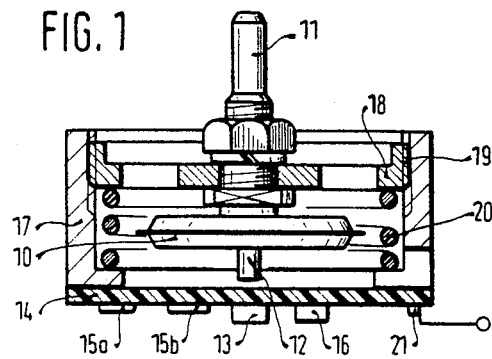
FIG. 1 is a schematic cross-section, with the membrane chamber in side elevation, of a first embodiment of the invention.

In FIG. 1 there appears a membrane chamber 10 into the interior of which a pressure is communicated through an access pipe stub 11. The membrane chamber 10 carries a permanent magnet 12, preferably an alloy of cobalt and a rare earth element, for example the well-known cobalt-samarium alloy (CoSm). A GaAs Hall element 13 is disposed in fixed position on a substrate plate 14 opposite the permanent magnet 12, on the far side of the substrate plate. The substrate plate 14 also carries a circuit of the hybrid type, which means that it is partly of the so-called printed type and partly of the discrete component type. This hybrid circuit comprises thick film resistors, 15a, 15b and at least one differential amplifier 16. The substrate plate 14 terminates one end of a casing 17 in which there is screwed a disc plug 18 having a threaded flange 19, the disc 18 carrying the access pipe 11 and also the membrane chamber 10 with its permanent magnet 12. A spring 20 bears at one end against the disc plug 18 and at the other against the casing 17. An electric connection 21 for the hybrid circuit on the substrate plate 14 is also provided.

When a pressure to be measured reaches the interior of the membrane chamber 10 through the access pipe 11, the membrane chamber 10 is deformed and the spacing of the permanent magnet 12 from the element 13 is varied. That variation produces a varying output signal of the element 13, while the GaAs of the element has a particularly low temperature coefficient even as the element produces a high signal yield.

By integration of the amplifier apparatus on the substrate plate 14 of the sensor casing 17, a direct evaluation of the output signal of the GaAs element 13 is made possible. By trimming or balancing of the thick layer resistors 15a and 15b, and so on, the characteristic curve of the pressure sensor can be adjusted. for example at different temperatures, so that a complete temperature range compensation can be accomplished. In accordance with the invention, the zero point of the output scale can be varied by turning the disc plug 18 in its screw thread mounting.

Of course the particular arrangement shown in FIG. 1 is to be understood only as an example for the measurement of a pressure that can be introduced into the membrane chamber 10 through a pressure line. It is of course also possible to provide the membrane chamber 10 as a completely closed absolute pressure chamber and to lead the pressure to be measured into the interior of the casing 17. Furthermore, it is possible to utilized more than one membrane chamber 10 influencing the same GaAs element 13, so that in such a way a pressure difference meansurement can be made. It is also possible to provide another permanent magnet on the axis of the sensor for compensation purposes on the opposite side of the GaAs element 13 from the permanent magnet 12, preferably mounted on another screw-in disc plug.

Figure 2:
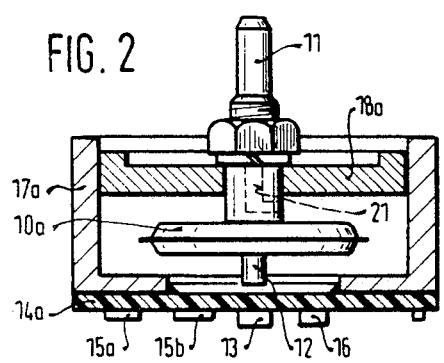
FIG. 2 is a similar schematic cross-section of a second embodiment.

It is also to be understood that the disc plug 18 of FIG. 1 for adjusting the membrane chamber 10 can be omitted if the membrane chamber 10 and its permanent magnet 12 have fully reproducible properties and therefore no longer have to have individual compensation for manufacturing tolerances. Such a case is illustrated in FIG. 2 in which the disc 18a is fixed in the casing 17a. The sensor of FIG. 2 is constituted as an absolute pressure sensor. The membrane chamber 10a is closed off and preferably evacuated. The measurement pressure is brought into the interior space of the casing 17a through the duct 11 and a channel 21 by-passing the membrane chamber 10a. The casing 17a is closed off pressure-tight at the bottom by the substrate plate 14a. The magnetic field sensitive element 13, as well as the elements 15a, 15b, 16 are disposed on the outer side of the substrate plate 14a, so that they are not exposed to the pressure medium at the inside of the casing 17a.

Figure 3:
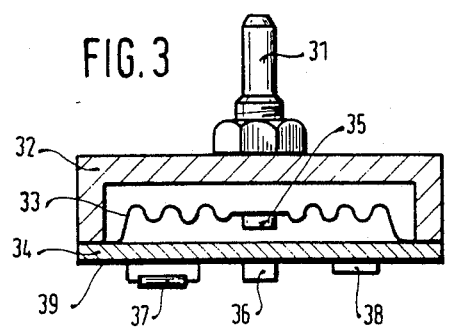
FIG. 3 is a cross-section, also schematic, of a highly compact third embodiment of the invention.

In the further embodiment shown in FIG. 3 the pressure sensor 31 according to the invention again is exposed to a pressure introduced through a pipe 31 into the interior of a casing 32. In this way an absolute pressure can be brought to be measured. The closed absolute pressure measuring chamber required for the purpose is constituted by a corrugated membrane half-chamber 33 which is soldered onto a copper substrate 34 and carries the permanent magnet 35. The copper substrate plate 34 has an enamel insulation layer 39 on its outer surface one which the GaAs element 36 and also the thick film resistors 38 and an amplifier 37 are disposed.

The absolute pressure measurement chamber formed by the corrugated membrane half-chamber 33 and the substrate plate 34 is preferably evacuated, so that the absolute pressure to be measured supplied through the access pipe 31 produces the deformation of the corrugated half-chamber membrane 33 and therewith the displacement of the permanent magnet 34 relative to the GaAs element 36. In this manner, a particularly compact construction of a pressure sensor for absolute pressure measurment is obtained, with at the same time utilizing a unitary technology for the manufacture of the absolute pressure chamber.

Although the invention has been described with reference to three illustrated embodiments, it is to be understood that other variations and modifications are possible within the inventive concept.

I claim:

1. Pressure sensor having a casing (17, 17a, 32) containing a membrane chamber (10, 10a, 33) comprising at least one resilient membrane providing shape-restoring force against which pressure produces deformation of said membrane, said membrane being disposed substantially symmertrically about an axis which is also the axis of said casing, one resilient membrane of said membrane chamber carrying a permanent magnet (12,35), said sensor further comprising a substrate plate (14, 14a, 34) constituting one wall of said casing which is spaced from and opposite the membrane of said membrane chamber which carries said permanent magnet;

a GaAs Hall element (13, 36) mounted on said substrate plate for providing a response to the magnetic field of said magnet dependent upon the position of said magnet, and a hybrid-type circuit including thick film resistors (15a, 15b; 38) having different temperature coefficients and also a differential amplifier (16, 36), all carried on said substrate plate and connected for providing a temperature compensated response signal of Hall element.

2. Pressure sensor according to claim 1, in which said membrane chamber (10a) is a fully closed-off absolute pressure chamber and said casing (17a) is closed off by said substrate plate (14a) so as to form a chamber around said pressure chamber in which a pressure to be measured reigns and in which said circuit and said Hall element are on the side of said substrate plate turned away from said chamber in which reigns said pressure to be measured.

3. Pressure sensor according to claim 2, in which said substrate plate (34) consists of copper and is provided with an enamel insulation layer (39) and in which said membrane chamber is formed by a corrugated half-chamber membrane (33) soldered onto said substrate plate (34).

* * * * *